United States Patent
Keysberg

(10) Patent No.: US 11,292,410 B2
(45) Date of Patent: Apr. 5, 2022

(54) ARRANGEMENT OF A SENSOR WHICH HAS A SENSOR-ACTIVE SURFACE ON AN EXTERIOR ATTACHMENT PART OF A VEHICLE

(71) Applicant: Audi AG, Ingolstadt (DE)

(72) Inventor: Niels Keysberg, Haltern am See (DE)

(73) Assignee: Audi AG, Ingolstadt (DE)

( * ) Notice: Subject to any disclaimer, the term of this patent is extended or adjusted under 35 U.S.C. 154(b) by 224 days.

(21) Appl. No.: 16/642,289

(22) PCT Filed: Jul. 2, 2018

(86) PCT No.: PCT/EP2018/067815
§ 371 (c)(1),
(2) Date: Feb. 26, 2020

(87) PCT Pub. No.: WO2019/063153
PCT Pub. Date: Apr. 4, 2019

(65) Prior Publication Data
US 2021/0086712 A1 Mar. 25, 2021

(30) Foreign Application Priority Data
Sep. 27, 2017 (DE) .................. 10 2017 009 055.6

(51) Int. Cl.
*B60R 19/48* (2006.01)
*G01S 13/931* (2020.01)
*B60R 11/00* (2006.01)

(52) U.S. Cl.
CPC ..... *B60R 19/483* (2013.01); *B60R 2011/0047* (2013.01); *B60R 2011/0084* (2013.01); *G01S 2013/93275* (2020.01)

(58) Field of Classification Search
CPC ..... B60R 19/483; B60R 19/005; B60R 11/00; B60R 2011/008; B60R 2011/0047;
(Continued)

(56) References Cited

U.S. PATENT DOCUMENTS 4,105,237 A * 8/1978 Viall, Sr. .................. B60R 19/56
180/275
9,682,728 B2 * 6/2017 Taneda .................. G01S 13/931
(Continued)

FOREIGN PATENT DOCUMENTS

| DE | 19945075 A1 | 4/2000 |
| DE | 102005047181 A1 | 4/2007 |

(Continued)

OTHER PUBLICATIONS

International Search Report and Written Opinion of the International Searching Authority directed to related International Patent Application No. PCT/EP2018/067815, dated Oct. 1, 2018, with attached English-language translation; 16 pages.
(Continued)

*Primary Examiner* — Gregory A Blankenship
(74) *Attorney, Agent, or Firm* — Sterne, Kessler, Goldstein & Fox P.L.L.C.

(57) ABSTRACT

An arrangement for a sensor having a sensor-active surface on or behind an exterior attachment part of a vehicle includes a sensor guide. The sensor guide includes a traction element made of a shape-memory alloy and a restoring element. The traction element moves the sensor in the direction of the vehicle interior between an active position and a protected position in response to a detected impending collision in the low-speed range or a detected collision in the low-speed range. The restoring element moves the sensor back to the active position from the protected position.

5 Claims, 1 Drawing Sheet

(58) Field of Classification Search
CPC ... B60R 2011/0084; G01S 2013/93271; G01S 2013/9327; G01S 2013/93275; G01S 7/027; G01S 7/4813; G01S 13/931; G01S 17/931

See application file for complete search history.

(56) References Cited

U.S. PATENT DOCUMENTS

| | | | |
|---|---|---|---|
| 9,956,993 B1* | 5/2018 | Klop | B60R 19/483 |
| 10,207,741 B2* | 2/2019 | Klop | B60R 19/483 |
| 10,797,384 B2* | 10/2020 | Singh | H01Q 1/3233 |
| 2019/0198986 A1* | 6/2019 | Singh | H01Q 1/3233 |
| 2020/0238910 A1* | 7/2020 | Wilson | H04N 5/22521 |
| 2021/0009086 A1* | 1/2021 | Horibe | G01S 15/931 |
| 2021/0086713 A1* | 3/2021 | Rojas | B60R 21/34 |

FOREIGN PATENT DOCUMENTS

| | | | | |
|---|---|---|---|---|
| DE | 102007005322 A1 | | 7/2008 | |
| DE | 102017006273 | * | 1/2019 | ........... B60R 19/483 |
| DE | 102019210776 | * | 4/2021 | |
| GB | 2493909 | * | 2/2013 | ............ G01S 15/88 |
| WO | WO 2016/073873 A1 | | 5/2016 | |
| WO | WO 2018/055289 A1 | | 3/2018 | |

OTHER PUBLICATIONS

International Preliminary Report on Patentability directed to related International Patent Application No. PCT/EP2018/067815, dated Mar. 31, 2020, with attached English-language translation; 13 pages.

* cited by examiner ured weak collision. After such a collision, it is ensured by means of the restoring means that the sensor is moved back into its use position, i.e. back to the active position, in order to be able to resume its operational function.

ARRANGEMENT OF A SENSOR WHICH HAS A SENSOR-ACTIVE SURFACE ON AN EXTERIOR ATTACHMENT PART OF A VEHICLE

TECHNICAL FIELD

The invention relates to an arrangement of a sensor which has a sensor-active surface on or behind an exterior attachment part of a vehicle.

BACKGROUND

Arrangements of sensors for driver assistance systems, emergency brake assistants, etc., which are installed on a vehicle front or a vehicle rear in the region of a bumper, are known from the prior art. Such sensors include, for example, proximity sensors, such as parking sensors or distance sensors, radars, night vision cameras, laser scanners, etc.

These sensors usually have an active sensor surface on the front and are installed, for example, in corresponding openings of the outer paneling of the bumper in such a way that the active sensor surface is flush with the outer paneling. Disadvantageously, such sensors, which are very expensive, can be damaged in so-called parking bumps during a parking operation, i.e. in the case of weak collisions, whereby high repair costs cannot be ruled out. Furthermore, there are legal requirements under certain conditions that prohibit the damage of certain sensors at parking bumps. This leads to installation positions that are unfavorable in terms of the sensor function and also have design disadvantages.

SUMMARY OF INVENTION

The object of the invention is to provide an arrangement of a sensor on or behind an exterior attachment part, for example on a bumper, so that in case of a weak collision with a low collision speed in the low speed range, the damage of such a sensor is prevented.

This object is achieved by an arrangement having the features of claim 1.

Such an arrangement of a sensor which has a sensor-active surface on an exterior attachment part of a vehicle is designed with a sensor guide with a traction means of a shape-memory alloy and a restoring means, wherein the sensor can be moved out of an active position into a protected position in the direction of the vehicle interior by means of the traction means in the event of a detected impending collision in the low-speed range and/or in the event of a detected collision in the low-speed range, and the sensor is displaced by means of the restoring means from the protected position back to the active position.

In an imminent or a currently detected weak collision, i.e. in the low-speed range of less than 4 km/h, the traction means consisting of a shape-memory alloy is thermally activated, whereby the traction means is shortened, thereby displacing the sensor from its active position to the protected position thereof in the direction of the vehicle interior by means of this traction means. In this protected position, the sensor will not be damaged if the weak collision occurs. The sensor is moved by means of the restoring means from the protected position back to its active position, in which the sensor is fully functional again. The active position of the sensor thus represents its position of use, in which he can perform his operational function.

With such an arrangement according to an embodiment of the invention, the sensor remains free of damage in the case of a weak collision in the low-speed range, since it is protected in the protected position against damage in the event of an imminent weak collision or a currently detected weak collision. After such a collision, it is ensured by means of the restoring means that the sensor is moved back into its use position, i.e. back to the active position, in order to be able to resume its operational function.

It is particularly advantageous if, as a further development, the traction means is designed as a traction spring. Preferably, it also makes sense to design the restoring means as a conventional traction spring. Thus, a restoring force is generated by the method of the sensor in the protected position by means of this traction spring, with which the sensor is displaced back into its active position.

According to a further advantageous embodiment of the invention, the traction means is designed such that upon application of an electrical voltage, a shortening of the traction means is effected, whereby the sensor connected to the traction means is displaced from the active position into the protected position.

Particularly advantageous and structurally simple to implement is an embodiment of the sensor guide as a rail system, with which the sensor is held and is displaceable between the active position and the protected position.

BRIEF DESCRIPTION OF THE FIGURES

Further advantages, features and details of the invention will become apparent from the claims, the following description of preferred embodiments and from the drawings, in which:

DETAILED DESCRIPTION OF THE FIGURES

Figure 1:
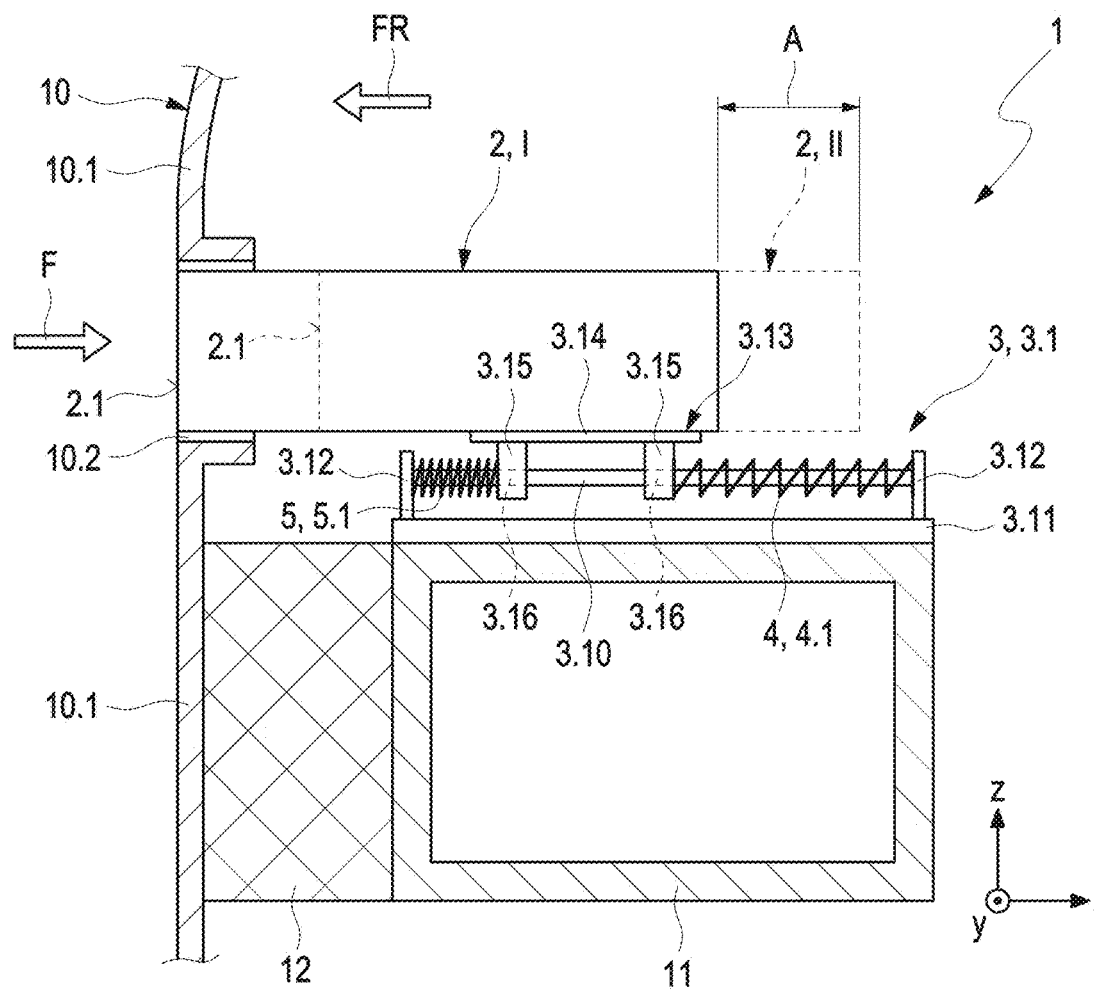
FIG. 1 shows a schematic side view of the arrangement according to a first embodiment of the invention.
Figure 2:
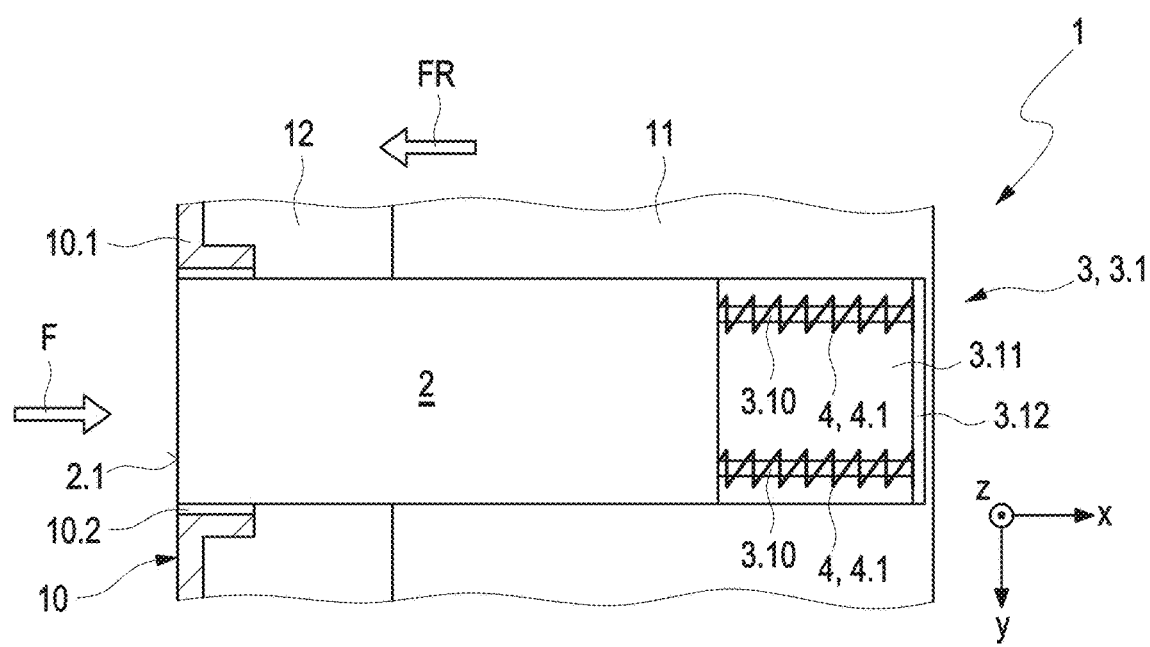
FIG. 2 shows a plan view of the arrangement according to FIG. 1.

The exemplary embodiment of the arrangement 1 with a sensor 2 according to an embodiment of the invention shown in FIGS. 1 and 2 is described by way of example on a front-side bumper as an external attachment 10 of a vehicle. This exterior attachment 10 has a vehicle outer skin 10.1, which can also be realized as a radiator grille or as a bumper cover. The sensor 2 is designed, for example, as a radar sensor or as a laser scanner.

According to FIGS. 1 and 2, the sensor 2 is arranged on a bumper cross member 11 by means of a sensor guide 3 designed as a rail system 3.1 and is displaceable between an active position I shown in FIGS. 1 and 2 and a protected position II indicated in FIG. 1. In the active position I, the sensor 2 performs its operational function, while the guard position II represents a position in which the sensor 2 is not damaged in collisions in the low-speed range.

Between the bumper cross member 11 and the vehicle outer skin 10.1, a pedestrian protection deformation element 12 is arranged.

In the active position I, the front end of the sensor 2 projects with its active sensor surface 2.1 into a sensor opening 10.2, thereby closing flush with the vehicle outer skin 10.1. For tolerance reasons and due to the displaceability of the sensor 2, an air gap between the sensor 2 and the sensor opening 10.2 is present.

Alternatively to the surface flushing of the active sensor surface 2.1 of the sensor 2 with the sensor opening 10.2, the sensor 2 can also be located behind a vehicle outer skin 10.1 (with or without distance therefrom and with or without a sensor opening 10.2) or can be brought forward or shifted back in relation to a larger sensor opening in the vehicle outer skin.

With the rail guide 3.1 as a sensor guide 3, not only the displaceability of the sensor 2 but also the mounting thereof is realized.

The rail guide 3.1 includes two round rails 3.10 which are parallel to the vehicle longitudinal direction (x-direction), wherein said round rails are arranged between end plates 3.12 arranged with an end face on a support plate 3.11. On these two round rails 3.10, a sliding carriage 3.13 is arranged with a support plate 3.14, on which the sensor 2 is mounted. On the opposite side to the sensor 2 of the support plate 3.14, two guide elements 3.15 protrude to the vehicle longitudinal direction (x-direction), each having guide holes 3.16 for receiving the round rails 3.10. By means of these guide holes 3.16 of the two guide elements 3.15, the carriage 3.13, and thus the sensor 2, is displaceable along the round rails 3.10 in the vehicle longitudinal direction (x-direction).

Furthermore, the rail guide 3.1 has a traction means 4, which as a sensor guide 3 is made of a shape-memory alloy in the form of a traction spring 4.1. The rail guide 3.1 has a restoring means 5 also in the form of a traction spring 5.1. On one of the two round rails 3.10 of the slide guide 3.1, these two traction springs 4.1 and 5.1 can be arranged. However, it is also possible to arrange, respectively, a traction spring 4.1 and a traction spring 5.1 on both round rails 3.10, as shown in FIGS. 1 and 2.

According to FIGS. 1 and 2, a traction spring 4.1 is made of a shape-memory alloy and arranged on each of the two round rails 3.10. Traction spring 4.1 is connected on the one hand with the rear end plate seen in the direction of travel F 3.12 and on the other hand with the back guide element 3.15 of the carriage 3.13 viewed in the direction of travel F. A traction spring 5.1 is also arranged in each case on the two round rails 3.10. Traction spring 5.1 is connected on the one hand with the front end plate seen in the direction of travel 3.12 and on the other hand with the front guide member 3.15 of the carriage 3.13 seen in the direction of travel.

Shape-memory alloys as active materials are special metallic materials that have a lower temperature martensite phase or a higher temperature austenite phase with a different crystal structure. Such shape-memory alloys can be used as mechanical actuators in the form of a wire or a spring. Deformed martensitic shape-memory alloys, when heated and converted to austenite, can return to their original undeformed shape and are able to exert a significant force.

When shortening the length of the spring made of a shape-memory alloy by means of an increase in temperature, said spring acts as a traction spring. The traction springs 4.1 used as traction means 4 according to FIGS. 1 and 2 each represent such a traction spring made of a shape-memory alloy.

In the active position I of the sensor 2 according to FIGS. 1 and 2, the traction springs 4.1 are in the martensite phase thereof, and the traction springs 5.1, which are designed as the usual passive element, as restoring means 5, are in their rest position, in which no traction force is generated.

When energizing the traction springs 4.1 by applying a voltage generated by a voltage source, for example an electrical system of the vehicle, to the ends of the traction springs 4.1, said springs are heated, thereby shortening said traction springs by generating a traction force acting on the carriage 3.13, whereby the carriage 3.13, and thus the sensor 2, is moved by a distance A to the protected position II according to FIG. 1 (see FIG. 1). At the same time, the traction spring 5.1 functioning as a restoring means 5 is stretched to generate a restoring force. The protected position II represents a position of the sensor 2 in which said sensor is not damaged in a weak collision, that is, in collisions in the low-speed range.

After the end of the energization of the traction spring 4.1, said traction spring cools down and returns to the original shape thereof, i.e. expands to the original length thereof. At the same time the restoring force generated by the traction spring 5.1 acts on the carriage 3.13, in that said carriage is retracted together with the sensor 2 in the active position I thereof.

In order to ensure a defined position of the carriage 3.13 in the active position I of the sensor 2, the carriage 3.13 is fixed laterally with a clip element or a locking ball. This fixation is achieved with the displacement due to the tensile force generated by the energized traction spring 4.1. With the retraction of the carriage 3.13 together with the sensor 2 in its active position II by means of the restoring force of the restoring means 5 designed as a return spring 5.1, the carriage 3.13 reengages into the defined position by means of the clip element or the locking ball.

In the case of an imminent collision load case detected by a suitable sensor in the low-speed range and/or in a currently detected collision load case in the low-speed range, the traction spring 4.1 is energized and thereby shortened while the sensor is displaced into its protected position II. This prevents damage in the event of such a weak impending collision of the sensor 2.

After the weak collision and after the end of the energization of the traction spring 4.1, the sensor 2 is retracted again into its active position I by means of the restoring means 5 designed as a return spring 5.1, wherein in said active position the sensor can perform its operational function again.

Such a weak impending collision occurs, for example, during a parking operation.

If ultrasonic sensors, as parking sensors, detect a critical distance of, for example, less than 0.5 m to an object in the immediate vicinity during a parking operation, the traction spring 4.1 is energized and thus the sensor 2 is moved into its protected position II, in order to thereby prevent damaging the sensor 2 designed, for example, as a radar sensor or as a laser scanner. With the completion of the parking process, the energization of the tension element 4.1 ends, so that then the sensor is moved back into its active position I by means of the restoring element 5 designed as a traction spring 5.1.

Another realization of the protection of the sensor 2 by means of the arrangement 1 is that the traction spring 4.1 is already energized at the beginning of a parking operation. As a precautionary measure, damage to the sensor 2 is prevented even in the event of a possibly occurring rear-end collision in the low-speed range. With the end of the parking process, the energization of the traction spring 4.1 also ends and thus the sensor 2 is returned to its active position I by means of the traction means 5 designed as a traction spring 5.1.

Since the carriage 3.13 having the sensor 2 is returned to the active position I, due to the increase of length caused by the cooling of the traction spring 4.1 and due to the restoring force of the restoring means 5 designed as a traction spring 5.1, the traction spring 4.1 must be energized in a certain interval of a few seconds. The time interval of the energization on the one hand depends on the temporal cooling behavior of the traction spring 4.1, i.e. it slowly expands again, and on the other hand on the spring characteristic, i.e. the spring force of the traction spring 5.1. A further parameter to be taken into account with regard to the energization duration of the traction spring 4.1 is the duration of a parking operation. The carriage 3.13 must remain in the protected position II together with the sensor 2 until the parking process is completed and the engine of the vehicle is turned off.

The exemplary embodiment described above having the arrangement 1 according to FIGS. 1 and 2 represents an active protection principle for the sensor 2 by means of the traction spring 4.1 produced by a shape-memory material in that the displacement of the sensor 2 is actively effected by the energization of the traction spring 4.1.

The arrangement according to FIGS. 1 and 2 can also be used for a passive protection of the sensor 2, in that, when the ignition of the vehicle is switched off, in which no energizing of the traction spring 4.1 is possible, said traction spring is used as a passive compression spring.

In a weak collision of the vehicle with another vehicle, a person or an object in the direction of the vehicle interior, i.e. in the vehicle longitudinal direction against the direction F, a force F acts directly on the active sensor surface 2.1 of the sensor 2, whereby the sensor 2 is moved directly from its active position I in the direction of the protected position II according to FIG. 1. The traction spring 4.1 acts in this case as a passive compression spring and is compressed due to the external force F to produce a restoring force. Due to the elastic property of the vehicle outer skin 10.1, said skin returns back to the original shape thereof after the end of the load by the force. At the same time, the sensor 2 is moved back in the direction of the active position I due to the restoring force of the traction spring 4.1 and of the traction spring 5.1, said restoring force being generated by the shift from the active position I, until the carriage 3.13 locks again in its defined position. Thus, the sensor 2 has regained its original active position I and is ready for operation after the collision.

In the exemplary embodiment shown in FIGS. 1 and 2, the traction means 4 consisting of a shape-memory alloy is formed as a traction spring 4.1. Instead of the traction spring 4.1, the traction means 5 can also be designed as a spring clip, sheet metal or wire, wherein such elements can be connected in parallel or in series to ensure a large travel.

The use of a traction device 4 made of a shape-memory alloy leads to the following advantages:
transmission of large forces,
ensuring the function over several million cycles,
large specific work capacities compared to other actuator principles,
small space,
high damping capacity,
noiseless,
low probability of default, and
cost-effective realization.

REFERENCE NUMERALS

1 arrangement
2 sensor
2.1 sensor-active surface of the sensor 2
3 sensor guide
3.1 rail system
3.10 round rail of the rail system 3.1
3.11 carrier plate of the rail system 3.1
3.12 end plate of the rail system 3.1
3.13 carriage of the financial system 3.1
3.14 support plate of the carriage 3.13
3.15 guide element of the carriage 3.13
3.16 guide openings of the guide element 3.15
4 traction means made of a shape-memory alloy
4.1 traction spring
5 restoring means
5.1 traction spring
10 exterior attachment part of a vehicle
10.1 vehicle outer skin
10.2 sensor opening
11 bumper crossmember
12 pedestrian protection deformation element

The invention claimed is:

1. An arrangement for a sensor having a sensor-active surface on or behind an exterior attachment part of a vehicle, comprising:
a sensor guide including a traction element that comprises a shape-memory alloy and a restoring element,
wherein the traction element is configured to move the sensor in a direction of a vehicle interior between an active position and a protected position in response to a detected impending collision or a detected collision, and
wherein the restoring element is configured to move the sensor back to the active position from the protected position.

2. The arrangement according to claim 1, wherein the traction element further comprises a traction spring.

3. The arrangement according to claim 1, wherein the restoring element comprises a traction spring.

4. The arrangement according to claim 1, wherein the traction element is configured to contract in response to receiving an application of electrical voltage, and as the traction element contracts, the traction element is configured to move the sensor from the active position to the protected position.

5. The arrangement according to claim 1, wherein the sensor guide comprises a rail system.

* * * * *